(12) United States Patent
Zwettler et al.

(10) Patent No.: US 6,474,582 B2
(45) Date of Patent: Nov. 5, 2002

(54) THREE-PIECE TAPE REEL ASSEMBLY WITH INTEGRATED DRIVING TEETH AND METAL FLANGES

(75) Inventors: Christopher J. Zwettler, Lake Elmo, MN (US); Michael E. Reard, Fergus Falls, MN (US); Geoffrey A. Lauinger, Campbell, MN (US); Jerry D. Brown, Wahpeton, ND (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/819,019

(22) Filed: Mar. 26, 2001

(65) Prior Publication Data

US 2002/0134875 A1 Sep. 26, 2002

(51) Int. Cl.[7] .................... G03B 23/02; G11B 23/107
(52) U.S. Cl. ............... 242/348.2; 242/348; 242/348.1; 242/332; 242/332.4; 242/609; 242/609.1; 242/608.2; 242/608.6
(58) Field of Search ............... 242/348.2, 348, 242/348.1, 332, 332.4, 609, 609.1, 608, 608.2, 608.6, 610, 610.5; 360/132

(56) References Cited

U.S. PATENT DOCUMENTS

| | | | |
|---|---|---|---|
| 3,857,531 A | | 12/1974 | Jantzen |
| 5,027,249 A | | 6/1991 | Johnson et al. |
| 5,101,308 A | * | 3/1992 | Urayama et al. ............ 242/198 |
| 5,297,755 A | | 3/1994 | Felde et al. |
| 5,400,981 A | * | 3/1995 | Rambosek et al. ......... 242/348 |
| 5,513,815 A | | 5/1996 | Erickson et al. |
| 5,562,258 A | | 10/1996 | Sato et al. |
| 5,564,647 A | | 10/1996 | Bay et al. |
| 6,057,992 A | * | 5/2000 | Kikuchi ...................... 242/346 |
| 6,154,342 A | * | 11/2000 | Vanderheyden et al. . 242/338.1 |
| 6,257,519 B1 | * | 7/2001 | Willems et al. .......... 242/608.6 |

FOREIGN PATENT DOCUMENTS

EP     0 588 219 B1     11/1998

* cited by examiner

Primary Examiner—Donald P. Walsh
Assistant Examiner—Jonathan R Miller
(74) Attorney, Agent, or Firm—Eric D. Levinson

(57) ABSTRACT

A tape reel assembly (14). The tape reel assembly (14) includes three discrete components. The components include a top flange (40), bottom flange (50) and hub (60). Teeth (65) are operatively connected to the hub (65). The flanges (40, 50) are preferably made from metal.

18 Claims, 5 Drawing Sheets

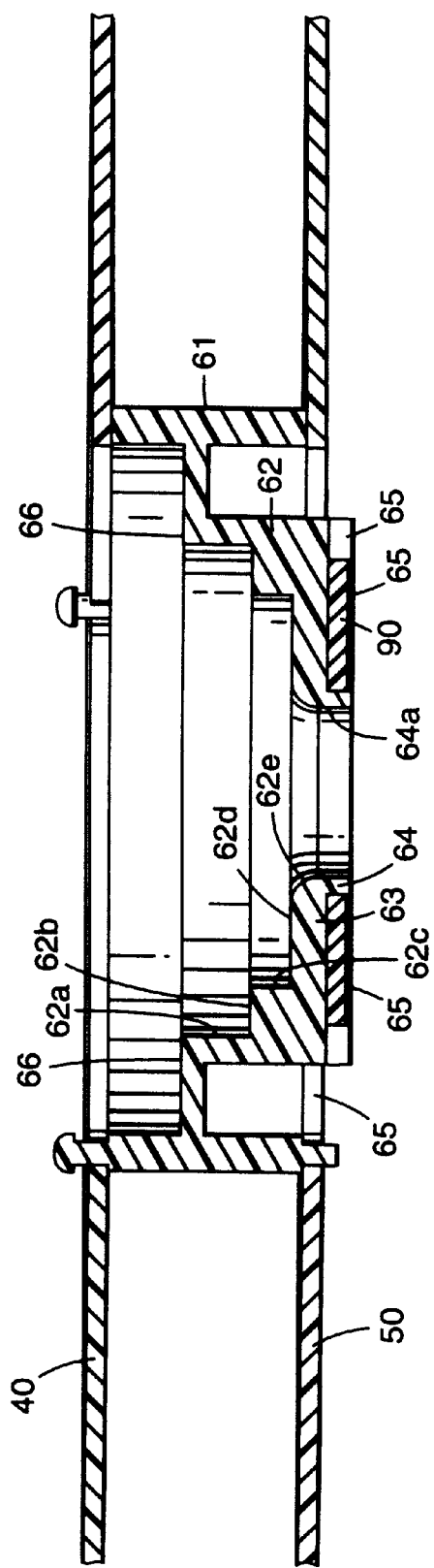

THREE-PIECE TAPE REEL ASSEMBLY WITH INTEGRATED DRIVING TEETH AND METAL FLANGES

BACKGROUND OF THE INVENTION

This invention relates generally to a data storage tape cartridge and more particularly to a three-piece tape reel assembly with integrated driving teeth and/or with metal hub flanges.

Cartridges have been used for decades in the computer, audio and video fields. The data storage tape cartridge continues to be an extremely popular form for recording large volumes of information for subsequent retrieval and use.

The data storage tape cartridge generally consists of an outer shell or housing maintaining at least one tape reel assembly and a length of magnetic storage tape. The storage tape is wrapped about a hub portion of a tape reel and is driven through a defined path by a driving system. The housing normally includes a separate cover and base, the combination of which forms an opening (or window) at a forward portion thereof for allowing access to the storage tape by a read/write head upon insertion of the data storage tape cartridge into a tape drive. This interaction between the storage tape and head may take place within the housing, or the storage tape may be directed away from the housing to an adjacent area at which the read/write head is located. Where the tape cartridge/drive system is designed to direct the storage tape away from the housing, a single tape reel assembly is normally employed. Conversely, when the tape cartridge/drive system is designed to provide head/storage tape interaction within or very near the housing, a two or dual-tape reel assembly configuration is typically utilized.

The tape reel assembly has typically been of two designs. The first is a three-piece assembly and the second is a two-piece assembly. The three-piece tape reel assembly includes a first flange member operatively connected to a second flange member by a hub. The second flange member will typically have teeth formed therein for connecting to a drive. In such a three-piece assembly, the flanges are able to be kept flatter because the hub is not formed as a portion of one of the flanges. However, one of the drawbacks of such a design is that the teeth are not directly coupled to the hub. The teeth are connected to the second flange and the flange in turn is connected to the hub. Therefore, backlash is possible and this will provide degradation in the concentricity of the winding surface.

In the two-piece tape reel assemblies, there is a first generally flat flange which is operatively connected to a second flange that has the hub integrally formed thereto. The teeth are formed in the second flange which has the hub formed as a portion thereof In such a construction, the hub is directly coupled to the teeth and there is no backlash problem. However, it is difficult to maintain the flatness of the second flange due to the hub being formed as a portion of the second flange. Also, because the hub is formed as a portion of the second flange, the stiffness throughout the tape reel, along the hub from the second flange to the first flange, varies as the tape cartridge is stiffer proximate the second flange and hub causing an asymmetrical collapse on the hub as the tape is wound.

With respect to both of the configurations noted above, the inherent flatness of a plastic spool flange is limited and this effects the precision that can be obtained on the flange-to-flange spacing. This out of flatness also may lead to servo errors as the part rotates in a drive. The flanges that are made of plastic are therefore of limited flatness and also limited stiffness. A stiffer flange would guard against damaging the tape edges during handling.

Further, with respect to both designs, the flanges are secured to the hub such that the flanges adversely impact the collapse of the hub when the tape is wound.

The present invention addresses the problems associated with the prior art data storage tape cartridges.

SUMMARY OF THE INVENTION

In one embodiment, the invention is a tape reel assembly for a data storage tape cartridge. The tape reel assembly includes a discrete first flange and a discrete second flange. A discrete tape hub having a first and second side as the first flange operatively connected to the first side of the hub and the second flange operatively connected to the second side of the hub. The second side of the hub has a plurality of teeth directly connected thereto.

In another embodiment, the invention is a tape reel assembly for a data storage tape cartridge. The tape reel assembly comprises a first and second flange. A tape hub has a first side and a second side, the first flange operatively connected to the first side of the hub and the second flange operatively connected to the second side of the hub. A plurality of driving teeth are operatively connected to the hub. One of the flanges is operatively connected to the hub, wherein said one of the flanges is axially held in place to the hub and allows for lateral movement with respect to the hub.

In another embodiment, the invention is a tape reel assembly for a data storage tape cartridge. The tape reel assembly includes a discrete first flange, a discrete second flange, and a discrete tape hub having a first side and a second side. The first flange is operatively connected to the first side of the hub and the second flange is operatively connected to the second side of the hub. The second side of the hub has a plurality of driving teeth directly connected thereto. One of the flanges is operatively connected to the hub wherein said one of the flanges is axially held in place to the hub and allows for lateral movement with respect to the hub.

BRIEF DESCRIPTION OF THE INVENTION

FIG. 6 is a cross-sectional view of the tape reel assembly shown in FIG. 2 taken generally along the lines 6—6.

DETAILED DESCRIPTION OF THE PREFERRED EMBODIMENT

Figure 1:
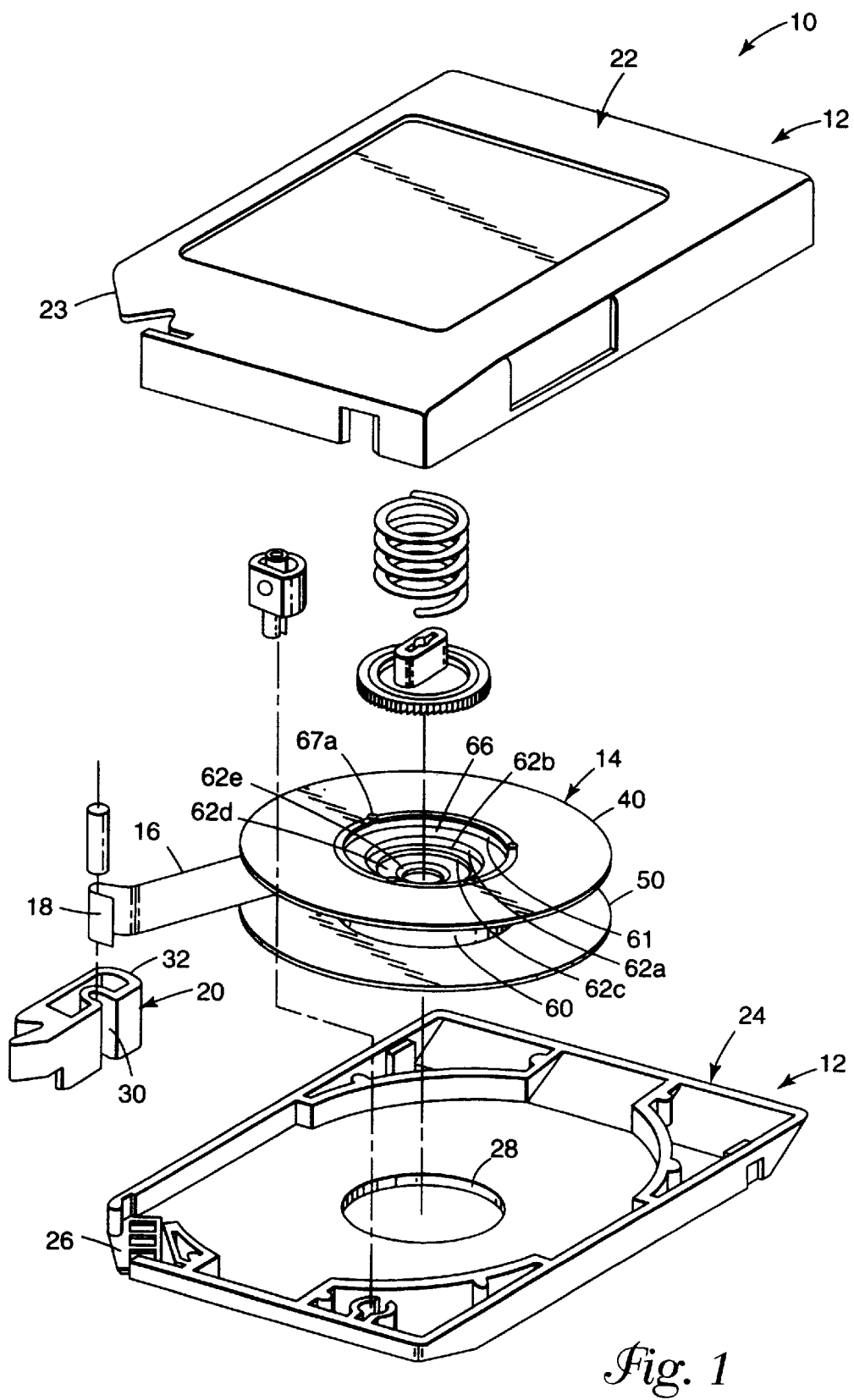
FIG. 1 is an exploded, perspective view of a data storage tape cartridge in accordance with the present invention.
Figure 2:
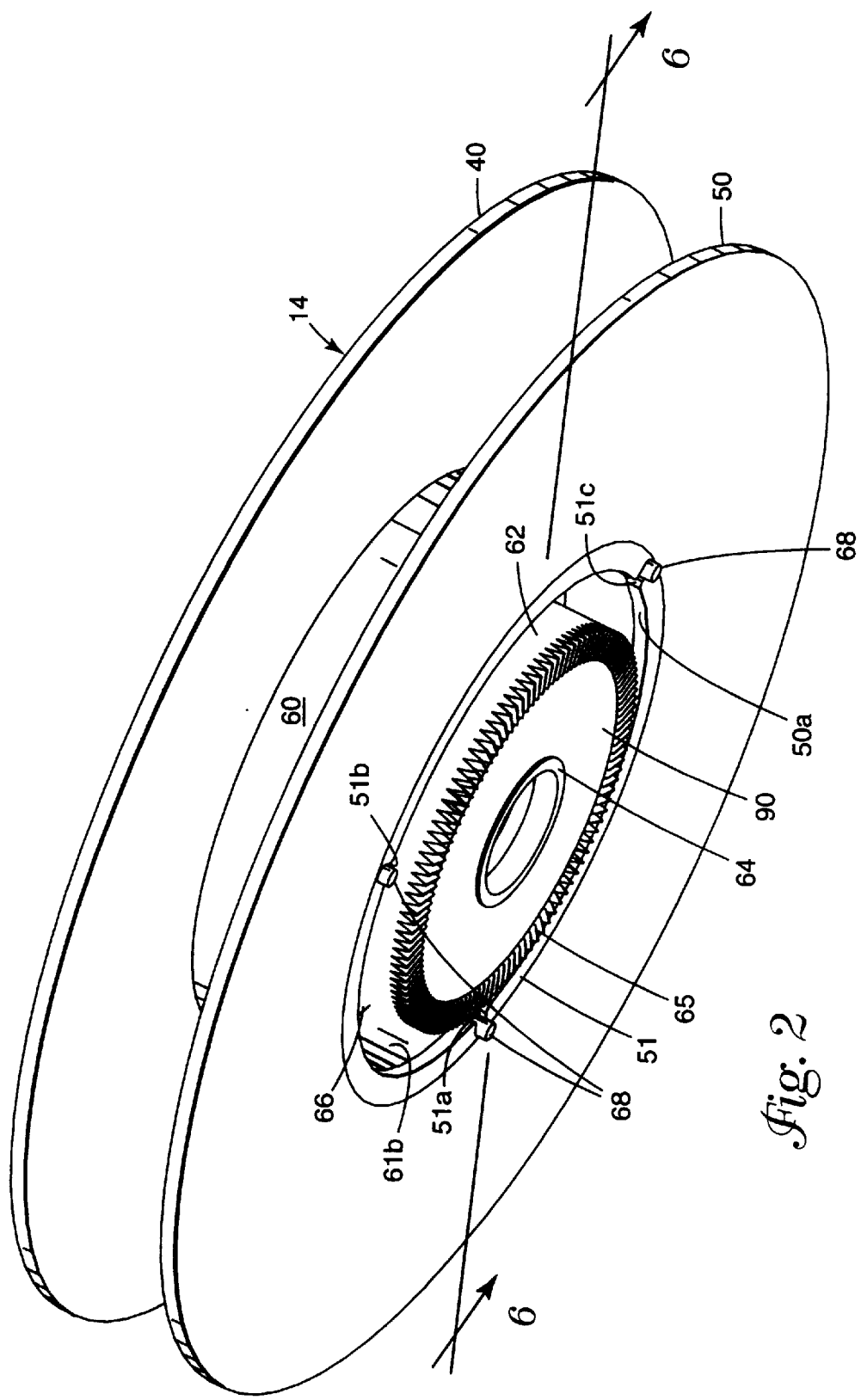
FIG. 2 is a perspective view of the tape reel assembly, as shown in FIG. 1.

One of the preferred embodiments of a data storage tape cartridge 10 is shown in FIG. 1. Generally speaking, the data storage tape cartridge 10 includes a housing 12, a tape reel assembly 14, and a storage tape 16. The tape reel assembly 14 is disposed within the housing 12. The storage tape 16, in turn, is wound around the tape reel assembly 14 and includes a free end 18 attached to a leader block 20.

The housing 12 is preferably sized to be received by a typical tape drive (not shown). Thus, the housing 12 may be sized for use within a 5.25 inch (130 mm) form factor drive, a 3.5 inch (90 mm) form factor drive, or other useful sizes. With this is mind, the housing 12 is defined by a first housing section 22 and a second housing section 24. In one preferred embodiment, the first housing section 22 forms a cover, whereas the second housing section 24 serves as a base. It should be understood that directional terminology, such as "cover", "base", "upper", "lower", "top", "bottom", etc. are used for purposes of illustration only, and are in no way limiting.

The first and second housing section 22, 24 are configured to be reciprocally mated to one another and are generally rectangular except for one corner 23 which is angled and forms a leader block window 26. The leader block window 26 is configured to hold the leader block 20 and serves as an opening for the storage tape 16 to exit from the housing 12 such that the storage tape 16 can be threaded through a tape drive (not shown) when the leader block 20 is removed from the leader block window 26. Conversely, when the leader block 20 is snapped into the leader block window 26, the leader block window 26 is covered.

In addition to the leader block window 26, the second housing section 24 further forms a central opening 28. The central opening 28 facilitates access to the tape reel assembly 14 by a drive chuck portion of a tape drive (not shown).

A front surface of the leader block 20 includes a slot 30 for engaging an automatic threading apparatus of a reel-to-reel magnetic tape drive apparatus (not shown) and engages an inclined surface of the corner 23 of the housing 12. A rear surface 32 is rounded to form a portion of an arc of a radius to match the periphery of the take-up hub in the tape drive apparatus as the leader block 20 fits into a slot in the take-up hub. A complaint section may be formed on the leader block 20 to permit the leader block 20 to compress as its rear surface to accommodate especially a first layer of the storage tape 16 when the storage tape 16 is wound onto the tape reel assembly 14.

The storage tape 16 is preferably a magnetic tape of a type commonly known in the art. For example, the storage tape 16 may consist of a balanced polyethylene naphthalate (PEN) based material coated on one side with a layer of magnetic material dispersed within a suitable binder system, and on the other side with a conductive material dispersed in suitable binder system. Acceptable magnetic tape is available, for example, from Imation Corp. of St. Paul, Minn.

The foregoing is illustrative and a general description of one version of a data storage tape cartridge. It is understood that the tape reel assembly 14 of the present invention may be used with any data storage tape cartridge that utilizes a tape reel assembly.

The tape reel assembly 14 has three major components that are discrete and are able to be manufactured independently of the other components, thereby allowing each of the components to be optimized for their particular function. The components include a top flange 40, bottom flange 50 and hub 60. In addition, a metal washer 90 is utilized, as will be described more fully hereafter.

The flanges 40, 50 may be made out of any suitable material such as plastics as used in the prior art. However, as will be discussed more fully hereafter, it is preferable that the flanges 40, 50 are made from a metal, such as aluminum and preferably anodized aluminum. The flanges 40, 50 are mirror images of each other. The flanges 40, 50 are generally disc shaped with a central opening 40a, 50a. Proximate the openings 40a, 50a is an inner ring 41, 51 that has three slots 41a–41c, 51a–51c formed therein. The slots extend radially inward.

The hub is generally designated at 60. The hub 60 includes a cylinder 61 having an outer, winding surface 61a and an inner surface 61b. A second generally cylindrical member positioned inside of the cylinder 61 is a driving member 62. The driving member 62 has an end section 63 having an outer surface 63a. A circular flange 64, having a central opening 64a extends away from the outer surface 63a. Also extending from the outer surface 63a around the periphery of the cylinder drive member 62 is a plurality of teeth 65. The teeth 65 are preferably formed as an integral portion of the driving member 62. As seen in FIG. 6, the teeth 65 extend beyond the washer 90. Further, at both sides of the driving member 62 are two rectangular areas which are also teeth, as the sectioning line 6—6 is in the valley between two teeth and is therefore not shown in cross section in FIG. 6. The driving member 62 is operatively connected to the cylinder 61 by a circular ring member 66. The ring member 66 is positioned between the ends of the cylinders 61, as seen in FIG. 6. The ring member 66 is generally positioned at the middle of the cylinder 61, but is slightly towards more towards the top flange 40 than the bottom flange 50. Preferably the ring member 66 is connected to the center of the ring 61 within 25 percent of the overall height of the ring 61 and more preferably within 10 percent. By being positioned away from the area where the flange is 40, 50 meet the cylinder 61, the support is such that as the tape 16 is being wound around the outer surface 61a, there is a symmetrical collapse since the web or ring member 66 is attached proximate the middle. This is opposed to the prior art devices where the attachment point was proximate the area where the flanges meet the hub.

Figure 4:
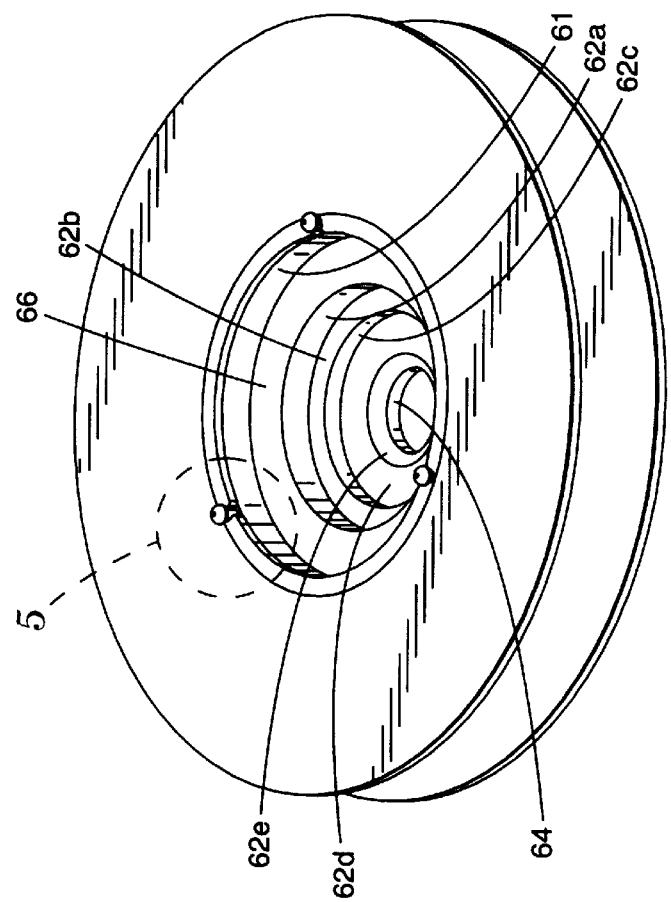
FIG. 4 is a perspective view, rotated 180 degrees of the tape reel assembly shown in FIG. 2.

As can be seen in FIGS. 4 and 6, the inside surface of the driving member 62 has a plurality of steps formed therein. A first generally vertical wall 62a terminates at a planar section 62b which in turn has a second vertical wall 62c attached thereto. The second vertical wall 62c terminates at a second planar section 62d where a radius portion 62e is connected to the circular flange 64.

Figure 3:
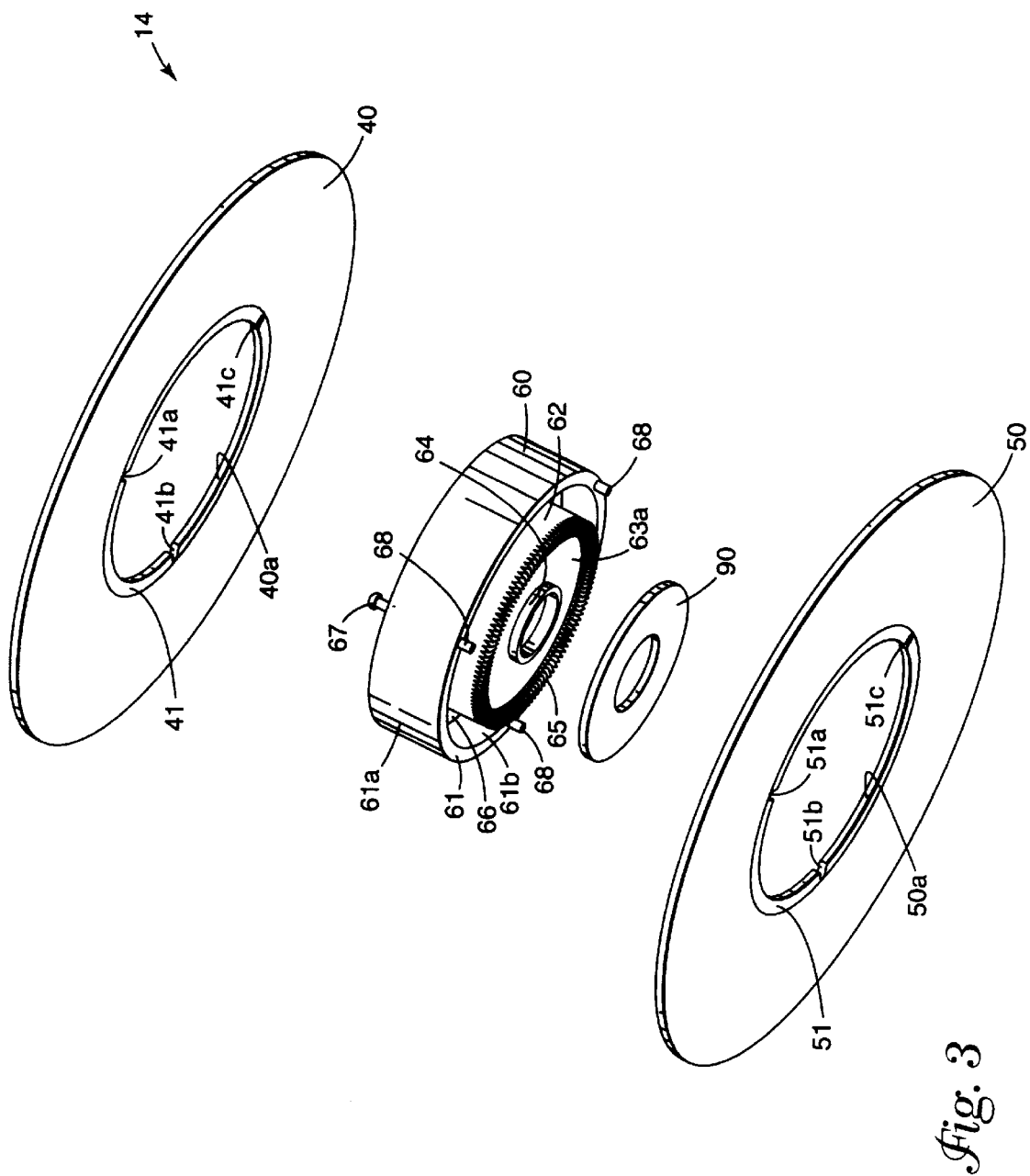
FIG. 3 is an exploded perspective view of the tape reel assembly shown in FIG. 2.
Figure 5:
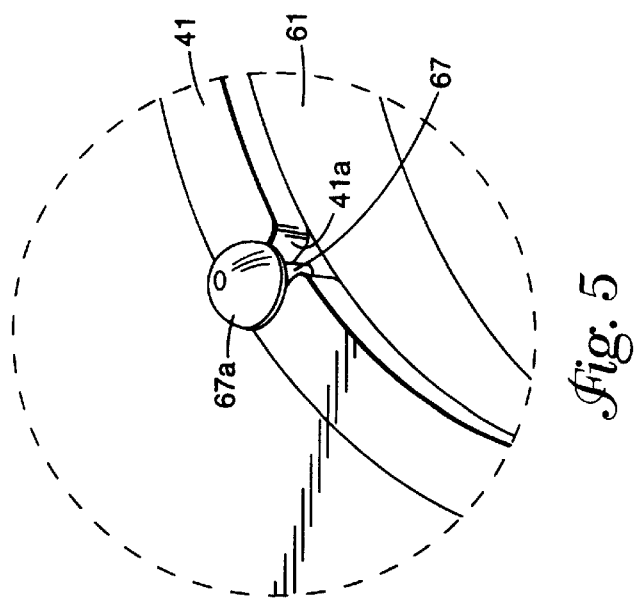
FIG. 5 is a partial enlarged perspective view of a portion of the tape reel assembly shown in FIG. 4.

Operatively connected to and preferably integral with the cylinder 61 are three top posts 67 and three bottom posts 68. The posts 67, 68 are spaced around the circumference of the cylinder 61 at the same spacings as the slots 41a–41c, 51a–51c. The slots 41a–41c, 51a–51c are sized and configured to receive the posts 67, 68. The posts 67, 68 are generally cylindrical. FIGS. 3–5 show the posts 67 after assembly of the tape reel assembly 14. In assembling the tape reel assembly 14, the top flange 40 is placed on top of the cylinder 61 so that the slots 41a–41c receive the post 67. The top portion of the posts 67 are deformed and an enlarged area 67a is formed to prevent the removal of the top flange 40. This may be accomplished by suitable means, well known in the art, such as heat staking. The bottom flange 50 is similarly connected by the post 68 to the bottom of the cylinder 61. The figures show posts 68 in the unassembled condition, it being understood the posts 68 would have an enlarged portion, after assembly, like area 67a. The metal washer 90 is secured to the outer surface 63a by suitable means such as adhesive. The use of slots and posts allow for the flanges to be secured to the cylinder 61, but, at the same time, allow for deformation of the hub 61 as tape is wound on the outer surface 61a. As the outer surface 61a deforms, the cylinder 61 deforms. However, because of the method of attachment, the posts 67, 68 are free to move inwardly and the slots 41a–41c, 51a–51c without deforming the flanges 40, 50.

The teeth 65 are sized and configured to match up to a suitable drive. The metal washer 90 is used as an attractant to a magnet that is on the drive, as is well known in the art.

The use of metal, such as aluminum or anodized aluminum provides for stiffer flanges by an increase in an order of magnitude over the prior art plastic flanges. By being stiffer, the flanges are less susceptible to distortion where they attach to the hub. Since the drive teeth 65 are integral to the hub 60, there would be no backlash as it exists in current three-piece plastic cup designs. Another advantage of having metal flanges is that the metal flanges will provide electrostatic shielding.

The securing of the flanges 40, 60 to the hub 60 with the notches 41a–41c, 51a–51c and posts 68 allow for the hub 60 to be compressed independently without experiencing restriction from the flanges 40, 50 as the tape 16 is wound around the hub 60 on the outer surface 61a. Enlarged area 67a and the enlarged area of post 68 prevent the flanges from moving apart from each other but does not prevent the hub from deforming inwardly as tape is wound around the hub. This inward deflection of the hub 60 does not place stresses on the flanges 40, 50 as the posts 67, 68 are free to move in the slots 41a through 41c, 51a through 51c. Otherwise said, the flanges are held axially, but not radially to the hub.

The three-piece design allows for the separate manufacturing of the components to allow each component to be optimized for its particular function. That is, tape hubs need to be round while flanges need to be flat. When the lower flange is combined with a tape hub, it becomes difficult to optimize the dimensions of each piece. In addition, as previously discussed, the flanges may be designed so that they attach to the hub with minimal impact on the flatness while still allowing collapse of the hub when wound with tape. Further, the three-piece construction allows for different materials to be utilized for each component. The flanges may be made of metal, as opposed to plastic, and thereby be stiffer. By having the teeth integrated with the hub, the flanges can be made of a variety of materials including thermoplastics, stamped or fine blanked aluminum.

We claim:

1. A tape reel assembly for a data storage tape cartridge, the tape reel assembly comprising:
   a) a first discrete flange;
   b) a second discrete flange;
   c) a discrete tape hub having a first side and a second side, the first flange operatively connected to the first side of the hub and the second flange operatively connected to the second side of the hub; and
   d) the hub comprising:
      i) a first cylinder having an outer, winding surface and an inner surface, the cylinder having a top and a bottom;
      ii) a second cylinder positioned inside the first cylinder, the second cylinder being a driving member, the driving member having a plurality of teeth, the driving member operatively connected to the inner surface of the first cylinder.

2. The tape reel assembly of claim 1, the flanges constructed from metal and the hub from plastic.

3. The tape reel assembly of claim 2, the metal being aluminum.

4. The tape reel assembly of claim 3, wherein the aluminum is anodized.

5. The tape reel assembly of claim 1, wherein the driving member is operatively connected to the inner surface between the top and bottom.

6. The tape reel assembly of claim 5, wherein the driving member is operatively connected to the inner surface proximate the middle of the inner surface.

7. The tape reel assembly of claim 1, the teeth being formed integral with the hub.

8. A tape reel assembly for a data storage tape cartridge, the tape reel assembly comprising:

a) a first flange;

b) a second flange;

c) a tape hub having a first side and a second side, the first flange operatively connected to the first side of the hub and the second flange operatively connected to the second side of the hub; and d) a plurality of driving teeth operatively connected to the hub;

e) one of the flanges operatively connected to the hub, said one of the flanges having a central opening and a plurality of slots formed in the central opening, the hub having a plurality of posts extending from the hub, the posts sized and configured to be positioned in the plurality of slots, the posts having an enlarged end to hold said one of the flanges in place axially and allowing lateral movement when the hub is collapsed during tape winding.

9. The tape reel assembly of claim 8, the flanges constructed from metal and the hub from plastic.

10. The tape reel assembly of claim 9, the metal being aluminum.

11. The tape reel assembly of claim 10, wherein the aluminum is anodized.

12. The tape reel assembly of claim 8, the hub comprising:
   a) a cylinder having an outer, winding surface and an inner surface, the cylinder having a top and a bottom;
   b) a driving member having a plurality of teeth, the drive member operatively connected to the inner surface of the hub.

13. The tape reel assembly of claim 12, wherein the driving member is operatively connected to the inner surface between the top and bottom.

14. The tape reel assembly of claim 13, wherein the driving member is operatively connected to the inner surface proximate the middle of the inner surface.

15. The tape reel assembly of claim 8, the teeth being formed integral with the hub.

16. A tape reel assembly for a data storage tape cartridge, the tape reel assembly comprising:

a) a first discrete flange;

b) a second discrete flange;

c) a discrete tape hub having a first side and a second side, the first flange operatively connected to the first side of the hub and the second flange operatively connected to the second side of the hub;

d) the second side of the hub having a plurality of driving teeth directly connected thereto; and e) one of the flanges operatively connected to the hub, wherein said one of the flanges is axially held in place to the hub, and allows for lateral movement with respect to the hub.

17. The tape reel of claim 16, said one of the flanges having a central opening and a plurality of slots formed in the central opening, the hub having a plurality of posts extending from the hub, the posts sized and configured to be positioned in the plurality of slots, the posts having an enlarged end to hold said one of the flanges in place axially and allowing lateral movement when the hub is collapsed during tape winding.

18. The tape reel of claim 17, the flanges constructed from metal and the hub from plastic.

* * * * *